UNITED STATES PATENT OFFICE.

SIEGMUND SAUBERMANN, OF BERLIN, GERMANY.

PROCESS FOR RENDERING LIQUIDS RADIO-ACTIVE.

1,236,213.  Specification of Letters Patent.  Patented Aug. 7, 1917.

No Drawing.  Application filed June 14, 1915.  Serial No. 34,119.

*To all whom it may concern:*

Be it known that I, SIEGMUND SAUBERMANN, a subject of the Turkish Emperor residing at 20 Rankestrasse, Berlin, Germany, have invented a new and useful Process for Rendering Liquids Radio-Active, of which the following is a specification.

It has been proposed to render liquids radio-active by treating the liquid, for example, water with an insoluble salt of radium contained in a suitable vessel.

By this method a loss in radium occurs owing to the fact that so called insoluble radium salts are in fact somewhat soluble when permanently in contact with water and when the exceedingly small quantities of radium employed and the very considerable quantities of water treated are taken into consideration it will be seen that the radium must gradually be dissolved.

According to this invention the liquid to be rendered radio-active is treated before coming into contact with a radio-active substance with a substance which tends to prevent the radio-active substance going into solution.

Substances adapted for this purpose resemble the radio-active substance physically and chemically.

The treatment may take place before the liquid is introduced into the treating vessel or the treatment may be concurrent therewith, the protective substance either surrounding the radio-active substance or being so located in reference thereto that the liquid entering the vessel comes into contact with the protective substance before reaching the radio-active substance.

It is not necessary that the solution of the protective substance should be highly concentrated but it should be sufficiently so to prevent attack of the radio-active substance.

When the liquid is treated in a suitable vessel concurrently with the radio-active substance and with the protective substance, it is only necessary, unless it is desired to render solutions of easily soluble salts radio-active, that the protective substance should be slightly more soluble than the radio-active substance. In this case the protective substance should be present in comparatively large quantities and the containing vessel should be of sufficient size for this purpose.

For example, radium sulfate is surrounded with a comparatively large quantity of barium sulfate or even with heavy spar in small pieces; similarly, radium carbonate is surrounded with a comparatively large quantity of calcium carbonate.

If a radio-active organic substance is employed a more easily soluble organic compound of calcium, barium or the like is employed. For instance, to prevent radium oxalate from going into solution, barium oxalate may be employed.

In place of radium other radio-active substances may be employed such as thorium and its disintegration products, also actinium and its disintegration products, especially as mesothorium is physically and chemically identical with radium.

Example 1: I add about 100 grams = 100,000 mgrs. of granulated barium sulfate to 1 mgr. of radium sulfate.

Example 2: I add from two to three hundred grams = 200,000 or 300,000 mgrs. of calcium carbonate to 1 mgr. of radium carbonate because the latter material is more soluble than barium carbonate especially in water containing carbonic acid.

In accordance with my invention, the substances which are employed to prevent solution of the radium salts, contain in all cases, the same anion as the radium salts treated, and also contain a cathion which is very similar to radium, both chemically and physically, except as to the radio-active properties.

What I claim is:—

1. A process of rendering a liquid radio-active by subjecting such liquid to contact with a given radio-active substance, which process comprises first treating the liquid with a non-radioactive compound of a metal having most of the chemical and physical properties of the said radio-active substance in question, except the radio-activity, and said compound being materially more soluble in the said liquid than said radio-active substances, and being capable of reducing the capacity of the said liquid to dissolve said radio-active substance; and only thereafter bringing said liquid into contact with the said radio-active substance.

2. A process of rendering an aqueous liquid radio-active by subjecting said liquid to contact with the radium salt of an organic acid, which process comprises first subjecting the said liquid to the action of a salt of an alkaline earth metal with such acid, which alkaline earth metal salt is materially more soluble in said liquid than is the said radium compound and is non-radio-active, and having otherwise chemical and physical properties similar to those of said radium salt, and being capable of reducing the capacity of said liquid to dissolve the said radium salt; and thereafter bringing such so treated solvent into contact with such radium salt.

3. A process of imparting radio-active properties to a liquid, which process comprises surrounding a radio-active substance with a non-radio-active compound having many of the chemical and physical properties of said radio-active substance, but being more soluble in the said liquid than the said radio-active substance and being non-radio-active, and thereafter bringing such structure into contact with said liquid.

4. A process of charging an aqueous liquid with radium emanation, which consists in subjecting said liquid first to the action of an alkaline earth metal salt which salt is materially more soluble in said liquid than is the radium salt having the same acid radical, and which alkaline earth salt is also non-radio-active, and thereafter bringing such so-treated solvent into contact with the radium salt containing the same acid radical as said alkaline earth salt.

SIEGMUND SAUBERMANN.

Witnesses:
WOLDEMAR HAUPT,
HENRY HASPER.